United States Patent [19]
Tonutti

[11] Patent Number: 5,493,853
[45] Date of Patent: Feb. 27, 1996

[54] DRAW BAR BIFOLD HAY RAKE

[75] Inventor: Carletto Tonutti, Tricesimo, Italy

[73] Assignee: Tonutti S.P.A., Italy

[21] Appl. No.: 142,183

[22] Filed: Oct. 26, 1993

[51] Int. Cl.$^6$ ................................................ A01D 78/00
[52] U.S. Cl. ................................................ 56/377; 56/380
[58] Field of Search ...................... 56/15.5, 15.9, 56/366, 367, 384, DIG. 21, 15.2, 15.1, 377

[56] References Cited

U.S. PATENT DOCUMENTS

| | | | |
|---|---|---|---|
| 2,727,347 | 12/1955 | Fenster et al. | 56/365 |
| 2,895,278 | 7/1959 | Huddle et al. | 56/15.2 |
| 3,948,028 | 4/1976 | Reber | 56/365 |
| 4,179,872 | 12/1979 | Gerlinger | 56/366 |
| 4,183,198 | 1/1980 | Sligter | 56/377 |
| 4,245,458 | 1/1981 | Smith | 56/376 |
| 4,370,846 | 2/1983 | Arnold | 56/6 |
| 4,723,402 | 2/1988 | Webster et al. | 56/377 |
| 4,785,614 | 11/1988 | Schoenherr | 56/365 |
| 4,947,631 | 8/1990 | Kuehn | 56/377 |
| 4,974,407 | 12/1990 | Rowe et al. | 56/377 |
| 4,977,734 | 12/1990 | Rowe et al. | 56/15.9 |
| 5,062,260 | 11/1991 | Tonutti | 56/377 |
| 5,127,216 | 7/1992 | Kelderman | 56/15.9 |
| 5,155,986 | 10/1992 | Kelderman | 56/365 |
| 5,177,945 | 1/1993 | Tonutti | 56/365 |
| 5,231,829 | 8/1993 | Tonutti | 56/377 |
| 5,263,306 | 11/1993 | Tonutti | 56/377 |

*Primary Examiner*—Ramon S. Britts
*Assistant Examiner*—Pamela A. O'Connor
*Attorney, Agent, or Firm*—Andrus, Sceales, Starke & Sawall

[57] ABSTRACT

A pull-type bifold hay rake includes a draw bar mounted at its rearward end to a cross-member, with a pair of rake arms pivotably mounted to the cross-member. A series of rotatable rakes are mounted to each rake arm for movement between a raised and lowered position. A linkage assembly is interposed between the draw bar and the rake arms for moving the rake arms between an operative open position and an inoperative closed position. A hydraulic cylinder assembly, including an extendible and retractable rod, is interconnected with the linkage and with the draw bar for moving the linkage between a first position in which the rake arms are open and a second position in which the rake arms are closed. A cable and pulley arrangement is interconnected between the hydraulic cylinder assembly and a control rod mounted to each rake arm for providing movement of the rake assemblies between their raised and lowered positions in response to operation of the hydraulic cylinder assembly. A locking arrangement is interposed between the linkage assembly and the draw bar for securing the linkage assembly, and thereby the rake arms, to the draw bar when the rake arms are in their closed position during storage and transport of the rake.

16 Claims, 2 Drawing Sheets

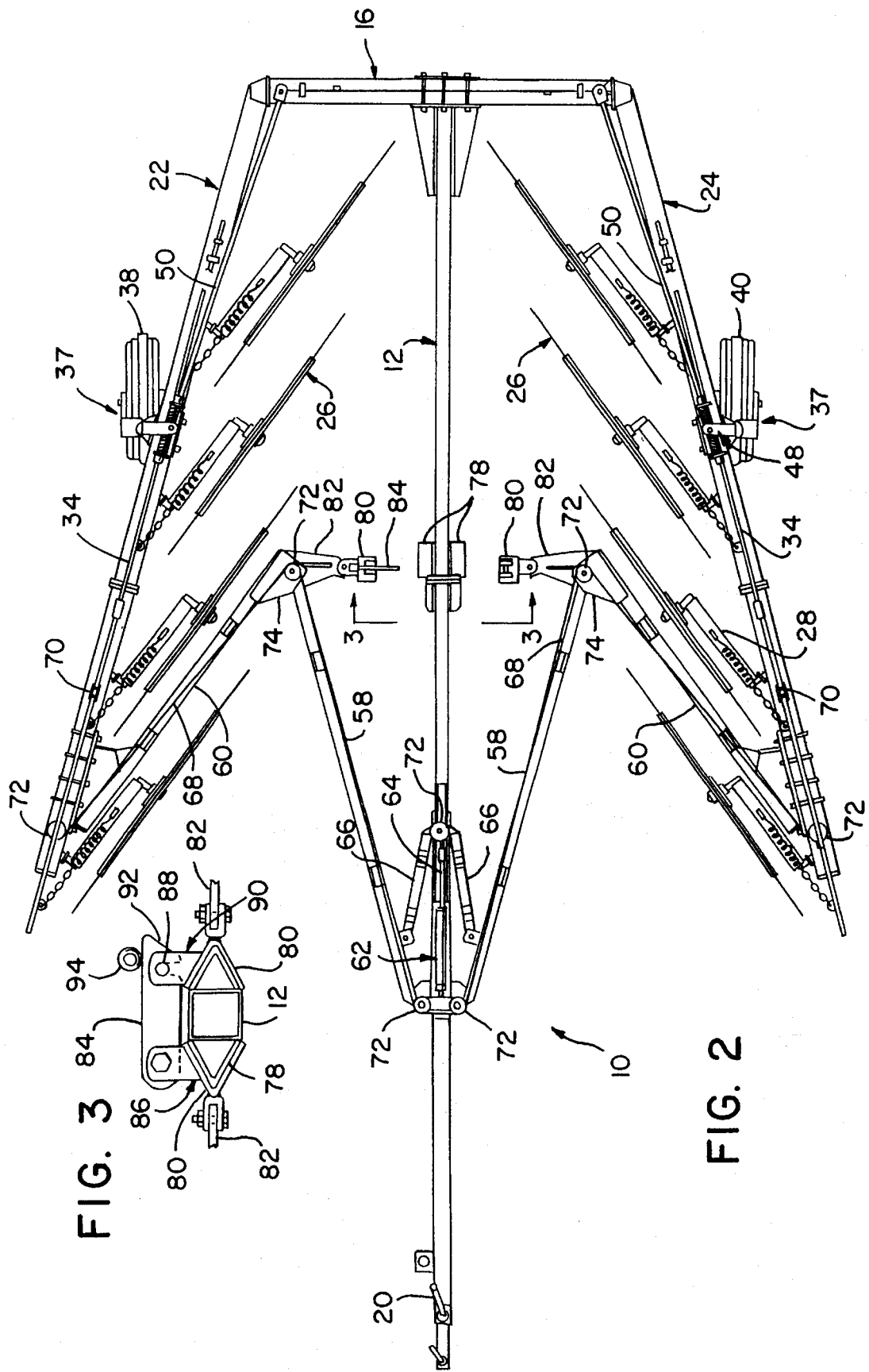

DRAW BAR BIFOLD HAY RAKE

BACKGROUND AND SUMMARY OF THE INVENTION

This invention relates to a pull-type hay rake, and more particularly to a bifold hay rake having a pair of rake arms which are interconnected with a frame for movement between an inoperative closed position and an operative open position.

Bifold hay rakes are well known in the art, and generally include a cross-member to which a pair of rake arms are pivotably mounted. A series of rakes are mounted to each rake arm, and are movable between an operative lowered position and an inoperative raised position. The rake arms are movable between a closed position in which the rake arms are moved toward each other, and an open position in which the rake arms are moved apart from each other to form a generally V-shape when viewed in plan. An opening and closing mechanism is connected to the rake arms for selectively moving the rake arms between their open and closed positions.

An example of a bifold hay rake of this type is illustrated in Tonutti U.S. Pat. No. 5,062,260, the disclosure of which is hereby incorporated by reference. This patent discloses a pair of rear wheels mounted one to each end of the cross-member, and a pair of front wheels mounted one to each rake arm forwardly of the rear wheels. A closed polygonal frame assembly is movable between first and second positions to move the rake arms between their closed and open positions, respectively, in response to operation of a hydraulic cylinder or the like.

It is an object of the present invention to provide a bifold hay rake which utilizes a draw bar and a single pair of wheels, as opposed to two sets of wheels as disclosed in Tonutti U.S. Pat. No. 5,062,260. It is a further object of the invention to provide a bifold hay rake which includes a simple and efficient mechanism for moving the rake arms between their open and closed positions, interposed between the rake arms and the draw bar. Yet another object of the invention is to provide a bifold hay rake providing automatic raising and lowering of the rakes in response to movement of the rake arms between their closed and open positions. A still further object of the invention is to provide a bifold hay rake in which the rake arms can be easily and securely locked in their closed position during transport.

In accordance with the invention, a pull-type bifold hay rake includes a draw bar connectable to a tow vehicle, and a cross-member mounted to the draw bar terminating in a pair of spaced ends disposed one on either side of the draw bar. A pair of rake arms are pivotably mounted one to each end of the cross-member, with each rake arm having a series of rotatable rake wheels mounted thereto. Each rake arm is pivotable between an operative open position in which the rake arms are moved away from each other and an inoperative closed position in which the rake arms are moved toward each other. The rake wheels are movably mounted to the rake arms for movement between an inoperative raised position and an operative lowered position. A pair of ground-engaging wheels are mounted to the rake on either side of the draw bar, and are preferably mounted to the rake arms. A rake arm actuator mechanism is interposed between the draw bar and the rake arms for selectively moving the rake arms between their open and closed positions, and a rake wheel actuator mechanism is interconnected with the rake arms for selectively moving the rake wheels between their lowered position and their raised position. The rake wheel actuator mechanism is responsive to operation of the rake arm actuator mechanism for moving the rake wheels to their lowered position when the rake arms are moved to their open position, and for moving the rake wheels to their raised position when the rake arms are moved to their closed position. The rake arm actuator mechanism includes a linkage mechanism interconnected between the draw bar and each rake arm, with the linkage mechanism being movable between a first position in which the rake arms are moved to their open position and a second position in which the rake arms are moved to their closed position. The linkage mechanism is movable between its first and second positions responsive to operation of an extendible and retractable assembly, such as a hydraulic cylinder assembly, interconnected between the linkage mechanism and the draw bar. The rake wheel actuator mechanism includes a cable-actuated system interconnected with the hydraulic cylinder assembly and with the rake wheels for moving the rake wheels between their raised and lowered positions responsive to operation of the hydraulic cylinder assembly. The cable system includes a series of pulleys mounted to the linkage mechanism about which the cable is trained, with a pulley being located adjacent the pivotable interconnection of the linkage members with each other and with the draw bar. Each set of rake wheels is mounted to a longitudinally extending control rod which in turn is mounted for axial movement to the rake arm. The cable is interconnected with the control rod for providing axial movement of the control rod in response to operation of the hydraulic cylinder assembly for selectively moving the wheels between their raised and lowered positions.

In accordance with another aspect of the invention, a locking mechanism is interposed between the linkage mechanism and the draw bar for selectively locking the linkage mechanism to the draw bar when the linkage mechanism is in its second position and the rake arms are in their closed position, for use during transport of the rake. The locking mechanism includes interengageable locking structure mounted to the linkage mechanism on either side of the draw bar adjacent the pivotable connection of the link members on either side of the draw bar. The interengageable locking structure includes a movable latch member mounted to the linkage mechanism on one side of the draw bar and a stationary receiver mounted to the linkage mechanism on the other side of the draw bar. Engagement of the movable latch member with the stationary receiver secures the linkage mechanism together with the draw bar disposed therebetween, for positively retaining the rake arms in their closed position. Mating retainer structure is interposed between the draw bar and the interengageable locking structure for preventing movement of the linkage mechanism when the locking structure is interengaged together. The mating retainer structure includes a pair of tapered members extending one from either side of the draw bar, and a correspondingly tapered receiver member on the locking structure on either side of the draw bar for engaging the tapered members. Each tapered member and each receiver member define laterally tapered surfaces which extend in a front-rear direction, and which are engageable with each other for preventing relative vertical movement between the draw bar and the linkage mechanism when the locking structure is interengaged together.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a top plan view of the bifold hay rake of FIG. 1, showing the rake arms in their operative open position; and FIG. 3 is a partial section view taken along line 3—3 of FIG. 2, showing the locking mechanism interengaged together for retaining the rake arms in their inoperative closed position.

DETAILED DESCRIPTION OF THE INVENTION

Figure 1:
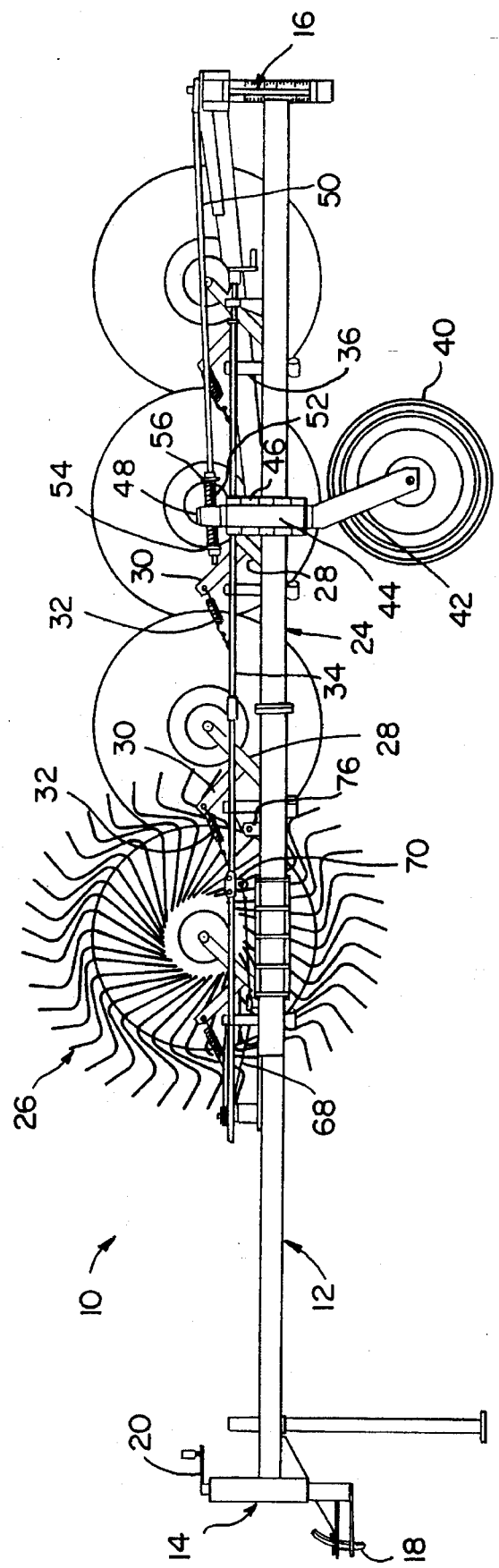
FIG. 1 is a side elevation view of a bifold hay rake constructed according to the invention.

Referring to FIGS. 1 and 2, a bifold hay rake 10 constructed according to the invention generally includes a longitudinally extending draw bar 12 having a mounting assembly 14 mounted to its forward end and a cross member 16 mounted to its rearward end. Mounting assembly 14 includes a pin 18 adapted for engagement with the hitch of a tractor. Mounting assembly 14 further includes a lever 20 for adjusting the vertical position of the forward end of draw bar 12 relative to the tractor for adjusting the vertical orientation of rake 10 relative to the ground.

Cross-member 16 is rigidly fixed to the rear end of draw bar 12, and a pair of rake arms 22, 24 are pivotably mounted to the ends of cross-member 16. Cross-member 16 may be constructed so as to allow it to either be lengthened or shortened, as desired, in order to increase or decrease the width of the windrow of crop material formed upon operation of rake 10. Cross-member 16 can either be a telescoping-type assembly providing adjustability in the length of cross-member 16, or rake arms 22, 24 may be mounted to cross-member 16 in a manner providing adjustment in the location of the connection of rake arms 22, 24 to cross-member 16. Either construction provides adjustability in the width of the windrow formed upon operation of rake 10.

A series of rake wheels 26 are mounted to each of rake arms 22, 24. Rakes 26 are conventional in construction, and each is mounted to rake arms 22, 24 by a mounting assembly providing movement of rakes 26 between an inoperative raised position, as shown in FIG. 1, and an operative lowered position. Each rake mounting assembly includes a bar 28 pivotally mounted at one end to one of rake arms 22, 24. A rake 26 is rotatably mounted to the opposite end of each bar 28. A second bar 30 is rigidly mounted to each bar 28, extending perpendicularly therefrom. A spring 32 is connected between the end of bar 30 opposite bar 28 and a control rod 34. Each control rod 34 extends parallel to the rake arm 22, 24 to which it is mounted. A series of vertical angle members 36 are mounted to the upper surface of each rake arm 22, 24, and each control rod 34 extends through aligned openings formed in vertical members 36 for providing longitudinal sliding movement of control rods 34 relative to rake arms 22, 24. Rearward movement of control rods 34 results in lowering each rake 26 to its lowered operative position by providing rearward pivoting movement of each bar 28 about its connection to rake arms 22, 24, while forward movement of control rods 34 results in raising of rakes 26 to their inoperative raised position by providing upwardly pivoting movement of each bar 28.

A pair of wheel assemblies 37 including ground-engaging, rubber-tired wheels 38, 40 are mounted to rake arms 22, 24, respectively. Wheels 38, 40 are self-directing, with each being mounted to a bracket 42 (FIG. 1), which in turn is mounted to a shaft 44 received within a sleeve 46. Each sleeve 46 is secured to one of rake arms, 22, 24. A bracket assembly 48 is mounted to the upper end of each shaft 46, and a rod, such as 50, is pinned at its forward end to bracket assembly 48 and pivotally at its rearward end to cross-member 16. A spring 52 is engaged between a pair of stops 54, 56 secured to rod 50 and the pin by which rod 50 is interconnected with bracket assembly 48, for biasing each tire, such as 40, to an orientation in which it is substantially parallel to the longitudinal axis of draw bar 12.

However, the wheel assemblies 37 also operate to assist in directing or steering the wheels 38, 40 as the hay rake is turned by the tractor to which it is attached. Lateral movement of the draw bar 12 as the tractor is turned results in a slight pivotal movement of each rake arm 22, 24 about its respective pivotal connection to the cross-member 16. This pivotal movement results in a slight shortening or lengthening, respectively, of the spring-biased connection of each connecting rod 50 to its respective bracket assembly 48 of the wheel. As a result, both wheels 38, 40 are biased to turn in the same direction as the draw bar is being turned by the tractor.

Referring to FIG. 2, a linkage assembly is interposed between the forward end of each of rake arms 22, 24 and draw bar 12. The linkage assembly includes a pair of inner link members 58 pivotably mounted at their forward ends to draw bar 12, and a pair of outer link members 60 pivotably mounted at their rearward ends to the rearward end of inner link members 58 and at their forward ends to rake arms 22, 24. A hydraulic cylinder assembly 62 has its cylinder end mounted to draw bar 12, and includes an extendible and retractable rod 64 interconnected through a pair of pivotably mounted links 66 with inner link members 58.

The linkage assembly made up of inner and outer links 58, 60 is movable between a first position as illustrated in FIG. 2 in which link members 58, 60 are moved apart from each other to move rake arms 22, 24 to their open position, and a second position in which links 58, 60 are moved together to draw rake arms 22, 24 together toward draw bar 12. Operation of hydraulic cylinder assembly 62 to retract its rod 64 results in movement of link members 58, 60 to their first position to open rake arms 22, 24, and operation of hydraulic cylinder assembly 62 to extend its rod 64 results in movement of links 58, 60 to their second position to close rake arms 22, 24. Hydraulic cylinder assembly 62 is interconnected with a conventional operator-controlled actuator mechanism for moving rake arms 22, 24 between their open and closed positions.

As shown in FIGS. 1 and 2, a cable 68 is interconnected with control rods 34 and with hydraulic cylinder assembly 62 for providing movement of rake assemblies 26 between their raised and lowered positions. At its ends, cable 68 is connected to tabs 70 rigidly mounted to control rods 34. Cable 68 is trained about a series of pulleys 72 mounted to the forward ends of rake arms 22, 24, to plates 74 mounted at the pivotal connection of inner and outer link members 58, 60, and to plate members mounted to draw bar 12 at the pivotal connection of the forward ends of inner link members 58 thereto. In addition, a pulley 72 is mounted to the end of extendible and retractable rod 64 of hydraulic cylinder assembly 62.

Operation of hydraulic cylinder assembly 62 to extend its rod 64 results in cable 68 drawing control rods 34 forwardly to raise rake assemblies 26 to their inoperative position.

Similarly, operation of hydraulic cylinder assembly 62 to retract its rod 64 slackens cable 68 so that, under the weight of rake assemblies 26, control rods 34 are moved rearwardly to enable rake assemblies 26 to be lowered to their operative position when rake arms 22, 24 are moved to their open position.

Instead of cable 68, a separate hydraulic cylinder assembly could be interposed between tabs 70 and an ear, such as shown in FIG. 1 at 76, mounted to each rake arm 22, 24. Ideally, these rake arm actuating hydraulic cylinders are interconnected with the actuating system for hydraulic cylinder assembly 62 in order to provide simultaneous raising and lowering of rake arms 28 during extension and retraction of hydraulic cylinder assembly 62.

Referring to FIGS. 2 and 3, a locking mechanism is interposed between draw bar 12 and the linkage assembly for retaining the linkage assembly in its second position, when rake arms 22, 24 are closed, to prevent opening of rake arms 22, 24 such as during transport or storage of rake 10. The locking mechanism includes a pair of tapered retainer members 78 mounted to the sides of draw bar 12, with each defining laterally tapered surfaces which extend in a front-to-rear direction. Receiver members 80 are pivotally mounted to plates 82 which extend inwardly from the intersection of inner and outer link members 58, 60. Each receiver member 80 includes mating structure for receiving and engaging the tapered surfaces of retainer members 78. A latch member 84 is pivotally mounted to a bracket assembly 86 mounted to one of receiver members 80, and a stationary pin 88 is mounted to a bracket assembly 90 connected to the other of the receiver members 80. Latch 84 includes an angled inner edge 92, and an eye 94 is mounted to its upper edge.

In operation, the locking mechanism of FIG. 3 attains its FIG. 3 position when inner and outer link members 58, 60, respectively, are moved to their second position in response to extension of hydraulic cylinder assembly 62, during which receiver members 80 engage retainer members 78, as shown in FIG. 3, with angled forward surface 92 of latch member 84 engaging pin 88, and riding along pin 88 until pin 88 is received within the downwardly facing slot formed in latch member 84, as shown. In this position, link members 58, 60 are securely locked to draw bar 12, and movement of rake arms 22, 24 away from their closed position is prevented. When it is desired to move rake arms 22, 24 to their open position, the operator lifts latch member 84, such as by use of a length of rope connected to eye 94, enabling the operator to release latch member 84 from the seat of the tractor. The operator then actuates hydraulic cylinder assembly 62 to retract rod 64, to move rake arms 22, 24 to their open position prior to operation of rake 10.

In the drawings and in the above description, moving of rake arms 22, 24 between their open and closed positions has been shown and described by operation of hydraulic cylinder assembly 62 acting on the linkage mechanism made up of link members 58, 60. It is also within the scope of the invention to eliminate hydraulic cylinder assembly 62 and links 66, so that rake arms 22, 24 can be moved between their open and closed positions in response to backward or forward movement of rake 10 by operation of the tow vehicle such as a tractor. For example, after latch member 84 is released when link members 58, 60 are in their second position and rake arms 22, 24 are in their closed position, the operator can draw rake 10 forwardly to move rake arms 22, 24 to their open position. To close rake arms 22, 24, the operator moves rake 10 in a rearward direction, which results in rake arms 22, 24 moving toward each other to their closed position. With this arrangement, it is necessary to provide a separate hydraulic cylinder for each of rake arms 22, 24 to move control rods 34 and thereby control the raising and lower of rake assemblies 26.

Various alternatives and embodiments are contemplated as being within the scope of the following claims particularly pointing out and distinctly claiming the subject matter regarded as the invention.

I claim:

1. A pull-type bifold hay rake, comprising:

a draw bar connectable to a tow vehicle;

a cross-member mounted to the draw bar terminating in a pair of spaced ends disposed one on either side of the draw bar;

a pair of rake arms pivotably mounted one to each end of the cross-member, each rake arm having a plurality of rotatable rake wheels mounted thereto, each rake arm being pivotable between an operative open position in which the rake arms are moved away from each other and an inoperative closed position in which the rake arms are moved toward each other;

wherein the rake wheels are movably mounted to the rake arms for movement between an inoperative raised position and an operative lowered position;

a pair of ground-engaging wheels mounted to the bifold hay rake one on either side of the draw bar;

a rake arm actuator mechanism interposed between the draw bar and the rake arms for selectively moving the rake arms between their open and closed positions, comprising an extendible and retractable assembly having an extendible and retractable member mounted to the draw bar at a location spaced from the cross-member; a linkage assembly interposed between the draw bar and each rake arm; including a first link member pivotably connected to the draw bar and a second link member pivotably connected to the rake arm; and an operating link member interposed between and pivotably interconnected with the first link member and the extendible and retractable member for controlling the position of the linkage assembly, and thereby each rake arm, relative to the draw bar; and a rake wheel actuator mechanism for selectively moving the rake wheels between their lowered and raised positions.

2. The bifold hay rake of claim 1, wherein the rake arm actuator mechanism comprises a linkage mechanism interconnected between the draw bar and each rake arm, wherein the linkage is movable between a first position for placing the rake arms in their operative open position and a second position for placing the rake arms in their inoperative closed position, and further comprising a locking mechanism interposed between the linkage mechanism and the draw bar for selectively locking the linkage mechanism to the draw bar when the linkage mechanism is in its second position.

3. A pull-type bifold hay rake, comprising:

a draw bar connectable to a tow vehicle;

a cross-member mounted to the draw bar terminating in a pair of spaced ends disposed one on either side of the draw bar;

a pair of rake arms pivotably mounted one-to each end of the cross member each rake arm having a plurality of rotatable rake wheels mounted thereto, each rake arm being pivotable between an operative open position in which the rake arms are moved away from each other and an inoperative closed position in which the rake arms are moved toward each other;

wherein the rake wheels are movably mounted to the rake arms for movement between an inoperative raised position and an operative lowered position;

a pair of ground-engaging wheels mounted to the bifold hay rake one on either side of the draw bar;

a rake arm actuator mechanism interposed between the draw bar and the rake arms for selectively moving the rake arms between their open and closed positions; and a rake wheel actuator mechanism for selectively moving the rake wheels between their lowered and raised positions;

wherein the rake wheel actuator mechanism is responsive to the rake arm actuator mechanism for moving the rake wheels to their lowered position when the rake arms are moved to their open position, and for moving the rake wheels to their raised position when the rake arms are moved to their closed position.

4. The bifold hay rake of claim 3, wherein the rake arm actuator mechanism comprises a linkage arrangement interconnected between the draw bar and each rake arm, the linkage mechanism being movable between a first position in which the rake arms are moved to their operative open position and a second position in which the rake arms are moved to their inoperative closed position.

5. The bifold hay rake of claim 4, wherein the rake arm actuator mechanism linkage is movable between its first and second positions responsive to operation of an extendible and retractable assembly interconnected between the linkage and the draw bar.

6. The bifold hay rake of claim 5, wherein the extendible and retractable assembly comprises a hydraulic cylinder assembly.

7. The bifold hay rake of claim 5, wherein the rake wheel actuator mechanism is responsive to the rake arm actuator mechanism by means of a cable arrangement interconnected with the extendible and retractable assembly and with the rake wheels for selectively moving the rake wheels between their inoperative raised position and operative lowered position responsive to operation of the extendible and retractable assembly.

8. The bifold hay rake of claim 7, wherein the cable arrangement includes a series of pulleys mounted to the linkage mechanism about which a cable is trained.

9. The bifold hay rake of claim 8, wherein the linkage mechanism includes a series of link members pivotably interconnected with each other and with the draw bar and the rake arms, and wherein a pulley is mounted adjacent the pivotable connections of the link members.

10. The bifold hay rake of claim 8, wherein the rake wheels are mounted to a longitudinally extending control rod mounted for axial movement to each rake arm, and wherein the cable is interconnected with the control rod for providing axial movement thereof in response to operation of the extendible and retractable assembly for selectively moving the rake wheels between their raised and lowered positions.

11. A pull-type bifold hay rake, comprising:

a draw bar connectable to a tow vehicle;

a cross-member mounted to the draw bar terminating in a pair of spaced ends disposed one on either side of the draw bar;

a pair of rake arms pivotably mounted one to each end of the gross-member each rake arm having a plurality of rotatable rake wheels mounted thereto each rake arm being pivotable between an operative open position in which the rake arms are moved away from each other and an inoperative closed position in which the rake arms are moved toward each other;

wherein the rake wheels are movably mounted to the rake arms for movement between an inoperative raised position and an operative lowered position;

a pair of ground-engaging wheels mounted to the bifold hay rake one on either side of the draw bar;

a rake arm actuator mechanism interposed between the draw bar add the rake arms for selectively moving the rake arms between their open and closed positions, wherein the rake arm actuator mechanism comprises a linkage mechanism interconnected between the draw bar and each rake arm wherein the linkage mechanism is movable between a first position for placing the rake arms in their operative open position and a second position for placing the rake arms in their inoperative closed position, wherein the linkage mechanism includes a series of link members pivotably interconnected with each other and with the draw bar, wherein a pair of link members are pivotably connected with each other on either side of the draw bar;

a locking mechanism interposed between the linkage mechanism and the draw bar for selectively locking the linkage mechanism to the draw bar when the linkage mechanism is in its second position, wherein the locking mechanism includes interengageable locking structure mounted to the linkage mechanism adjacent the pivotable connection of the link members on either side of the draw bar for securing the link members together with the draw bar therebetween; and a rake wheel actuator mechanism for selectively moving the rake wheels between their lowered and raised positions.

12. The bifold hay rake of claim 11, wherein the interengageable locking structure includes a movable latch member mounted to the linkage mechanism on one side of the draw bar and a stationary receiver mounted to the linkage mechanism on the other side of the draw bar.

13. The bifold hay rake of claim 11, further comprising mating structure interposed between the draw bar and the interengageable locking structure for preventing movement of the linkage mechanism relative to the draw bar when the locking structure is interengaged together.

14. The bifold hay rake of claim 13, wherein the mating structure includes a pair of tapered members extending one from either side of the draw bar, and a pair of correspondingly tapered receiver members provided on the interengageable locking structure on either side of the draw bar for engaging the tapered members.

15. The bifold hay rake of claim 14, wherein each tapered member and each receiver member define laterally tapered surfaces which extend in a front-rear direction, for preventing relative vertical movement between the draw bar and the linkage mechanism when the locking structure is interengaged together.

16. A pull-type bifold hay rake, comprising:

a draw bar connectable to a tow vehicle;

a pair of rake arms pivotably interconnected with the draw bar, each rake arm having a plurality of rotatable rake wheels mounted thereto, each rake arm being pivotable between an operative open position in which the rake arms are moved away from each other and an inoperative closed position in which the rake arms are moved toward each other with the draw bar disposed therebetween;

wherein the rake wheels are movably mounted to the rake arms for movement between an inoperative raised position and an operative lowered position;

a rake arm actuator mechanism interposed between the draw bar and the rake arms for selectively moving the rake arms between their open and closed positions, wherein the rake arm actuator mechanism includes a pair of pivotably connected lock members located between the draw bar and each rake arm; and a locking mechanism associated with the rake arm actuator mechanism for selectively securing the rake arms to the draw bar when in their closed position to prevent the rake arms from moving away from their closed position, wherein the locking mechanism includes interengageable locking structure mounted to at least one of the link members in each pair of link members adjacent the pivotable connection of the pair of link members for securing the link members together with the draw bar therebetween.

* * * * *

UNITED STATES PATENT AND TRADEMARK OFFICE
CERTIFICATE OF CORRECTION

PATENT NO. : 5,493,853
DATED : February 27, 1996
INVENTOR(S) : CARLETTO TONUTTI It is certified that error appears in the above-identified patent and that said Letters Patent is hereby corrected as shown below:

In The Claims

Claim 1, Col. 6, Line 34, delete ";" and substitute therefor -- , --; Claim 3, Col. 6, Line 61, delete "one-to" and substitute therefor -- one to --; Claim 3, Col. 6, Line 62, "cross member" should read --cross-member,-- Claim 7, Col. 7, Line 36, delete "with-the" and substitute therefor -- with the --; Claim 11, Col. 7, Line 64, delete "gross-member" and substitute therefor -- cross-member, --; Claim 11, Col. 7, Line 64, after "thereto" insert -- , --; Claim 11, Col. 8, Line 9, delete "add" and substitute therefor -- and --; Claim 11, Col. 8, Line 13, after "arm" insert -- , --.

Signed and Sealed this

Twentieth Day of August, 1996

Attest:

BRUCE LEHMAN

*Attesting Officer*     *Commissioner of Patents and Trademarks*